(12) United States Patent
Asikainen et al.

(10) Patent No.: US 9,290,886 B2
(45) Date of Patent: Mar. 22, 2016

(54) METHOD OF MANUFACTURING A SCREEN CYLINDER AND A SCREEN CYLINDER

(75) Inventors: Aku Asikainen, Varkaus (FI);
Christophe Hayart, Montreal (CA)

(73) Assignee: Aikawa Fiber Technologies Trust, Sherbrooke (CA)

( * ) Notice: Subject to any disclaimer, the term of this patent is extended or adjusted under 35 U.S.C. 154(b) by 353 days.

(21) Appl. No.: 13/823,324

(22) PCT Filed: Oct. 5, 2011

(86) PCT No.: PCT/FI2011/050859
§ 371 (c)(1),
(2), (4) Date: May 13, 2013

(87) PCT Pub. No.: WO2012/045911
PCT Pub. Date: Apr. 12, 2012

(65) Prior Publication Data
US 2013/0319932 A1    Dec. 5, 2013

(30) Foreign Application Priority Data

Oct. 6, 2010  (FI) ...................................... 20106029

(51) Int. Cl.
*B01D 29/13*    (2006.01)
*D21D 5/16*    (2006.01)

(52) U.S. Cl.
CPC *D21D 5/16* (2013.01); *B01D 29/13* (2013.01); *Y10T 29/49947* (2015.01)

(58) Field of Classification Search
None
See application file for complete search history.

(56) References Cited

U.S. PATENT DOCUMENTS

| 5,090,721 | A | 2/1992 | Lange |
| 5,094,360 | A | 3/1992 | Lange |
| 5,200,072 | A | 4/1993 | Frejborg et al. |
| 5,394,600 | A | 3/1995 | Chen |
| 6,460,757 | B1 * | 10/2002 | Ommundsen ................ 228/265 |
| 2001/0050253 | A1 | 12/2001 | May et al. |
| 2002/0130075 | A1 | 9/2002 | May et al. |

(Continued)

FOREIGN PATENT DOCUMENTS

| EP | 1630282 A1 | 3/2006 |
| JP | H0382887 A | 4/1991 |

(Continued)

OTHER PUBLICATIONS

International Search Report and Written Opinion prepared for parent PCT application PCT/FI2011/050859, mailed Dec. 16, 2011.

(Continued)

*Primary Examiner* — Benjamin Kurtz
(74) *Attorney, Agent, or Firm* — Tech Valley Patent, LLC; John Pietrangelo

(57) ABSTRACT

The present invention relates to a method of manufacturing a screen cylinder, and a screen cylinder that is particularly suitable for screening, filtering, fractionating, or sorting cellulose pulp or fiber suspensions of the pulp and paper making industry, or other similar suspensions. The present invention relates more particularly to screening or filtering devices of the type comprising a plurality of screen wires (10) positioned at a small spacing parallel to each other, the screen wires (10) being fastened into notches in the support elements (20) by means of shrink fitting the screen wires (10) into the notches by heating the second rim area (26) of the support ring (20) after the screen wires (10) have been inserted into the notches.

15 Claims, 3 Drawing Sheets

(56) References Cited

U.S. PATENT DOCUMENTS

| | | |
|---|---|---|
| 2004/0112827 A1 | 6/2004 | May et al. |
| 2007/0251092 A1 | 11/2007 | Asikainen |
| 2011/0042300 A1 | 2/2011 | Asikainen |

FOREIGN PATENT DOCUMENTS

| | | |
|---|---|---|
| JP | H04308294 A | 10/1992 |
| JP | H08-226090 A | 9/1996 |
| JP | 2007224489 A | 9/2007 |
| WO | 9814658 A1 | 4/1998 |

OTHER PUBLICATIONS

Office Action prepared by Japanese Patent Office for corresponding Japanese application 2013-532236 mailed on Jun. 25, 2015.

Office Action prepared by Chinese Patent Office for corresponding Chinese application 2011800483482 issued on Jul. 18, 2014, 11 pages.

Notification of Grant of Patent Rights prepared by Chinese Patent Office for corresponding Chinese application 2011800483482 issued on May 6, 2015, 2 pages.

* cited by examiner

METHOD OF MANUFACTURING A SCREEN CYLINDER AND A SCREEN CYLINDER

CROSS-REFERENCE TO RELATED APPLICATIONS

This application is a U.S. national phase application of International Application No. PCT/FI2011/050859 filed on 5 Oct. 2011, which designated the U.S., and which claims priority to Finnish Patent Application No. 20106029 filed on 6 Oct. 2010. The contents of each of these applications are hereby incorporated by reference in their entirety in this application.

BACKGROUND OF THE INVENTION

1. Technical Field

The present invention relates to a method of manufacturing a screen cylinder, and a screen cylinder that is particularly suitable for screening, filtering, fractionating, or sorting cellulose pulp or fiber suspensions of the pulp and paper industry, or other similar suspensions. The present invention relates more particularly to screening or filtering devices of the type comprising a plurality of screen wires positioned at a small spacing parallel to each other, the plurality of screen wires forming a screening or filtering surface facing the pulp or fiber suspension to be screened and adjacent wires forming screening openings therebetween allowing an accept portion of the pulp or fiber suspension to flow therethrough.

2. Description of Related Art

The first wire screens that appeared on the market had screen wires welded onto support rods or wound around the rods. One problem relating to such a structure is the positioning of the screen wires on the support rods such that the spacing i.e. the screening slots between the adjacent wires are substantially equal all over the screening surface. This problem was solved in the next generation wire screens by machining or otherwise arranging notches at desired intervals in the surface of the support rods the wires were supposed to be fastened. Now by attaching the screen wires to the notches the spacing between the wires is the desired one.

For instance, EP-A1-0 929 714 discusses a screening device in which the screen wires are fixed on the downstream side of the wires to transversely extending notches in solid support elements, i.e. support rings or support bars.

In known screening devices of this type, the support elements, which form the supports for the screen wires, are formed of solid bars, mainly rectangular but sometimes round or rounded in their cross section and most typically positioned perpendicular to the screen wires. However, the above-mentioned EP-A1-0 929 714 discloses a wire screen where the support ring is of specific construction, i.e. it is a U-shaped bar, to which the screen wires are attached by means of deformation in notches machined transverse to the support bar.

The screen wires are generally fastened to the support bars by a welding process which gives rise to a number of disadvantages such as variability distortion, thermal stresses and burrs. The heat induced by the welding often causes distortion of the wires and changes in the screening opening width between adjacent wires. It is therefore difficult to get completely uniform screening openings, which means that the efficiency of the screen suffers. Today, when the desired width of screening openings may be as small as 0.1 mm, or even smaller, only minimal distortions (if any) are acceptable.

The thermal stresses and the burrs may also lead to failure in operation due to the loading on the screening device in the users process. Such loading may be either in the form of a constant load or a cyclic loading giving rise to failure by fatigue. Burrs may also catch fibers of the suspension, leading to gradual clogging of the screen or filter, or the formation of so-called strings of fibers attached to each other which are very detrimental in the user's process.

Now that the use of notches in the support rods, bars or rings ensures that the distance between the adjacent screen wires is substantially constant, the next problem to solve is to find out how the screen wires could be fastened to the support rods or bars such that the fastening by means of welding would not bring any additional problems. The welding has been a reliable and simple way of securing the screen wires in the notches in the support rods or bars in such a manner that the wires would not be able to move in the notch. However, since the welding is apt to create some additional problems listed already above, a so called keyhole notch has been tested for replacing the welding. The keyhole notch or opening is machined either entirely inside the support element, or ring or bar, or machined such that the keyhole is open at one side of the support element or bar or ring. In both cases the wire is able to move in the notch only in the direction of its longitudinal axis. In other words, the keyhole either clamps the wire substantially tightly, or allows the wire to be slid into the keyhole in the direction of the longitudinal axis of the wire. Thus it is clear that the keyhole prevents the screen wire from moving in the direction of the pressure pulses created during the screening i.e. in the direction substantially perpendicular to the screen wires.

U.S. Pat. Nos. 5,090,721 and 5,094,360, for instance, suggest the attachment of screen wires by means of a certain keyhole cross section into notches in the support bar having the same keyhole form. The screen wires are inserted in the notches while the support bars are straight, i.e. not bent. By bending the support bars into support rings, the screen wires are clamped into the notches. This design, however, may not be reliable enough in the long run, and the keyhole fastening together with the clamping feature has been improved with a number of suggestions known better in the industry. In other words, gluing, soldering, welding etc. have been suggested to ensure the keyhole fastening.

The assembling of the screen wires to keyholes or notches in the support ring has been improved by using heat treatment of the support ring (see for instance U.S. Pat. No. 5,394,600). Both heating of the support bar before rounding such to a support ring or heating of the support ring has been suggested. The idea has been to heat the entire support element (bar or ring) to expand the notches such that the screen wires may be inserted into the notches. In other words, the heating has been performed prior to the screen wire installation, and the entire support element has been heated. However, such a heat treatment has not proven to be such a reliable way of fastening of the screen wires to the support rings that the fastening could manage without any further ways (listed already above) of ensuring the fastening.

SUMMARY OF THE INVENTION

The above difficulties, among others, tend to result in a poor quality of the screening or in mechanical weakness or in high manufacturing costs (for instance, the keyhole clamping needs a very accurate dimensioning of the keyhole notch) of a screen cylinder.

A solution to the above discussed problems has been suggested in WO-A2-2006008332 where the clamping of the screen wires in their keyhole notches in the support rings has been improved by heating the support rings on one lateral side (substantially radially extending plane of a support ring) thereof after inserting the screen wires in the notches i.e. after the assembly of the screen cylinder. The purpose of the heating is to bend the support rings so that their side faces turn from their original position in a radial plane into a slightly conical plane. While this bending of the support ring is performed, the axes of the keyhole notches in the support rings simultaneously change their direction from a direction parallel with the axis of the screen cylinder and that of the screen wire as well to a slightly inclined direction so that the edges of the support ring notches 'bite' the sides faces of the screen wires, and ensure a proper clamping of the screen wires in the notches.

Though the above discussed prior art clamping method has proven to be a clear improvement over the earlier prior art clamping methods that have required either welding, gluing, soldering or some other additional fastening methods to ensure the immobility of the screen wire in its notch in the support ring, the above discussed clamping method has its own small weaknesses. Firstly, always when the directions of the notch axis and the longitudinal axis of the screen wire installed in the recess are not exactly the same, a small gap is formed between the surfaces of the screen wire and the notch. Such a gap would indicate that the ring is not in full mechanical contact with the wire and not providing full strength. The gap is also apt to start collecting one or more fibers therein, which may result in the formation of a string of fibers that loosens from the gap from time and again and when possibly entering the paper making wire would reduce the quality of the end product. Secondly, the heating of a lateral face of a support ring is a challenging task as it should be done such that the effects of the heating are the same all over an individual support ring as well as over each and every support ring. Additionally, the heating of the screen wires should be avoided, in other words, though a lateral side face of a support ring is heated, the necessary high level of heating should not extend to the area of the screen wires.

It is therefore an object of the present invention to minimize the above-mentioned drawbacks and provide an improved screen cylinder and an improved method of manufacturing such.

It is thereby also an object of the present invention to provide an easily manufactured and assembled screen cylinder without thermally inducing distortion of the screen wires.

It is also an object of the present invention to provide an improved strong screen cylinder with accurate and consistent screening openings, i.e. screening slots.

It is thereby further an object of the present invention to provide an improved method of manufacturing a screen cylinder, so that uniform screening openings, i.e. good tolerances, are provided, whereby slots with very small widths may be manufactured.

It is a further object of the present invention to provide an improved screen cylinder with the minimum number of burrs or other protruding elements causing accumulation of fibers on upstream side surfaces of the support rods.

It is a still further object of the present invention to provide an improved screen cylinder with the minimum of large gaps or clearances between the screen wire and the support bar in the notch area the gaps or clearances which could lead to the accumulation of fibers to form flocs or strings in the accepts of the screening apparatus.

It is a yet further object of the present invention to provide an improved screen cylinder where the screen wires are attached to the support bar notches by means of mere clamping i.e. without welding, gluing or soldering.

In accordance with a preferred embodiment of the invention the support elements are in the form of individual rings arranged axially from each other. At least one of the support rings is heated after the assembly of the screen wires such that its diameter is permanently reduced whereby it clamps the screen wires in openings/notches in the support ring.

Characterizing features of the method of manufacturing a screen cylinder, said screen cylinder being formed of at least a number of screen wires with a screening slot therebetween, and substantially circular support rings, said support rings having a first rim area provided with openings/notches into which said screen wires are installed, and a second rim area opposite to said first rim area, are
  a. heating at least one of said support rings at its second rim area after the assembly of the screen cylinder such that the temperature of the first rim area remains substantially smaller, whereby the second rim area is deformed, and
  b. allowing said at least one support ring to cool down to decrease its diameter, whereby the first rim area is deformed and the screen wires are clamped in said notches.

A characterizing feature of the screen cylinder, said screen cylinder comprising substantially circular support rings, said support rings having a first rim area provided with notches and a second rim area opposite to said first rim area, a number of screen wires inserted into said notches and defining a screening slot between said screen wires, is that at least one of said support rings comprises a heated, after the assembly of the screen cylinder, second rim area having a diameter, the diameter being first expanded in substantially radial direction from its original diameter and thereafter, upon cooling, being reduced from its original diameter, thereby deforming the first rim area and clamping the screen wires in said notches.

The other characterizing features of the invention will become apparent from the appended dependent claims.

BRIEF DESCRIPTION OF THE DRAWINGS

In the following the method of manufacturing a screen cylinder and a screen cylinder will be explained in a more detailed manner with reference to the accompanying drawings of which

DETAILED DESCRIPTION OF THE INVENTION

Figure 1:
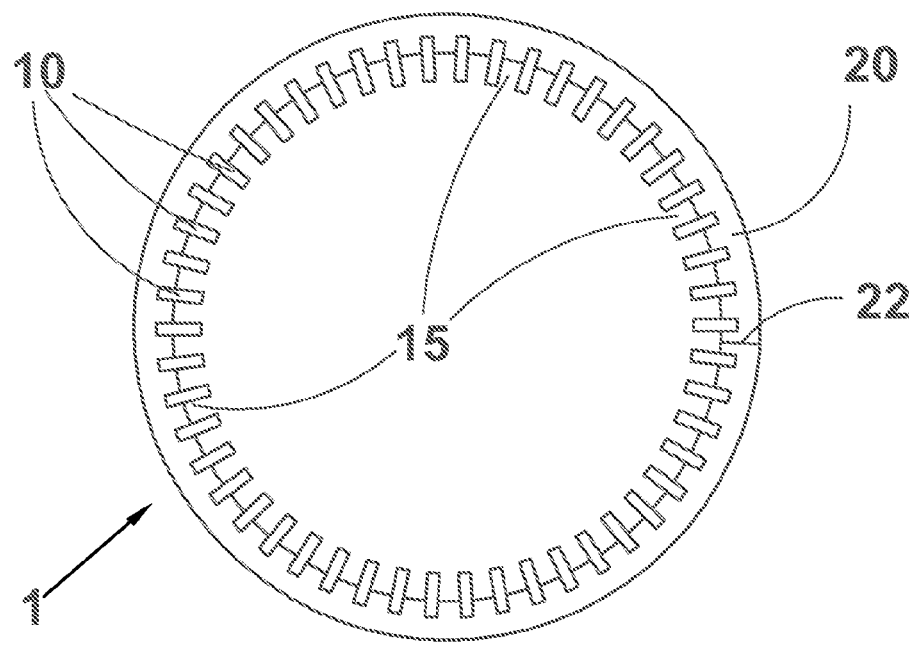
FIG. 1 illustrates schematically a wire screen cylinder of prior art.

FIG. 1 shows in a very schematic and simplified manner a wedge wire screen cylinder 1 of prior art, i.e. the screen wires and the support ring have not been sketched in scale, and neither the screening slot size nor the number of screen wires relate to any existing screen drum or screen cylinder. The screen cylinder 1 of FIG. 1 is shown as a radial cross section above one of its support rings. Additionally, the end rings, or the top and bottom rings of the screen cylinder are not shown. The prior art screen cylinder 1 is made of substantially axially-oriented screen wires 10, so-called "wedge wires" (originally the wire cross-section resembled a wedge, and most often still do) which are fastened, on one hand, to support elements 20 and, on the other hand, at their axial ends either directly or via the axially outermost support rings to the end rings (not shown) situated at opposite ends of the screen cylinder 1. Most often the wedge wire screen cylinder 1 is of the so-called "outflow" type like in FIG. 1. This means that the accept flow through the screening slots between the wires is from the inside of the screen cylinder to the outside thereof. To make this operation possible, the screen wires are normally attached to the radially inner rim of the support elements i.e. support rings. However, also so-called "inflow" type wedge-wire screen cylinders are known whereby the structure is opposite to that explained above. The distance between the adjacent screen wires 10 defines screening slots 15. The slot width is normally about 0.1-0.3 mm depending on the application of the screen cylinder 1. However, in some specific applications both narrower and clearly larger slot widths are used. The circular support elements or support rings 20 are arranged along the length of the screen wires in such a manner that the axial distance between the support elements 20 is about 20 to 100 mm depending again on the size and the application of the screen cylinder 1. The axial distance between adjacent support elements 20 is typically, but not always, constant along the length of the cylinder. The height or the thickness (in the axial direction of the screen cylinder) of the support element is normally about 3 to 10 mm and radial width from about 15 to about 50 mm. However, the dimensions may also vary from the above-mentioned ones in some special circumstances. The screen cylinder 1 is often manufactured such that the screen wires 10 are fastened to support bars 20 before the screen is rolled to a cylindrical form whereby the support bars 20 form the support elements or support rings 20 after the rolling. Sometimes the screen wires 10 are fastened to the support elements 20 after the bars have been bent and welded 22 to form circular rings, or to support elements 20 cut from sheet metal.

Figure 2:
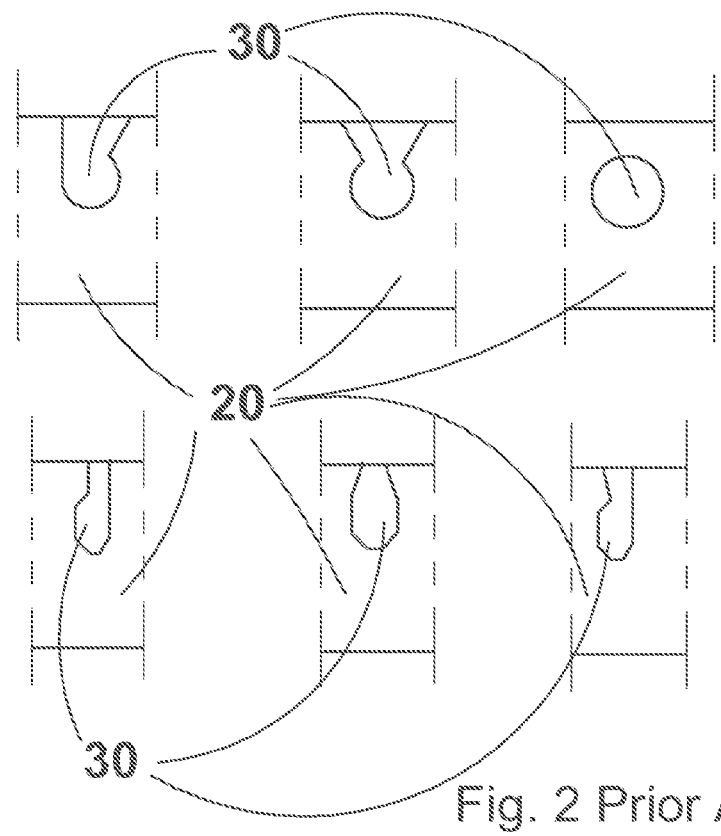
FIG. 2 illustrates schematically various embodiments of keyholes arranged, for instance machined, in the prior art support elements.

A common way of fastening and properly positioning the screen wires 10 to the support elements or support rings 20 is to use in the support elements 20 transverse notches or recesses or openings into which the screen wires 10 are inserted. FIG. 2 shows a few alternatives for the shape of the so-called keyhole or dovetail notch 30 in the support element 20 or support bar or support ring. A round (could as well be oval, rectangular, triangular or any other desired shape) opening in the support element 20 has been illustrated as an example of openings fully surrounded by the support element material. The notches and openings 30 have normally a few common features. Firstly, the notch/opening 30 is normally machined at right angles to the bar, or element 20, whereby the notch axis is perpendicular to the longitudinal axis of the support element. And, secondly, as shown by the drawings, the basic idea of the keyhole notch 30 (and naturally of an opening too) is to secure the screen wire in the notch 30 so that the screen wire 10 cannot move except in the direction of the longitudinal axis of the wire 10, i.e. at right angles to the radial plane the support element is located in. In other words, so-called "form locking" is used. Naturally, the movement of the screen wire 10 in the direction of its longitudinal axis is not a desired feature either, but it can be utilized in the assembly of the screen cylinder 1. In other words, if clamping of the wire in the notch, as discussed in U.S. Pat. Nos. 5,090,721 and 5,094,360 is not used for fastening the wires in the notch, the support bars may be readily bent and welded to circular support rings 20 whereafter the wires 10 are pushed manually, or forced by a hammer or by an automated device, into the notches 30. In this case the size and shape of the notches 30 should be very close to the size and shape of the cross-section of the screen wire 10. Then, to prevent the wires 10 from moving in their axial direction, the wires 10 may be welded, glued or soldered to the support ring 20, or the wire 10 may be deformed at the notch area so as to prevent its movement. However, all the discussed fastening methods are complicated, or they may create burrs, which collect fibers, or they may not provide a very precise or accurate slot width, or they may be otherwise not ideal for their desired purpose.

Figure 3:
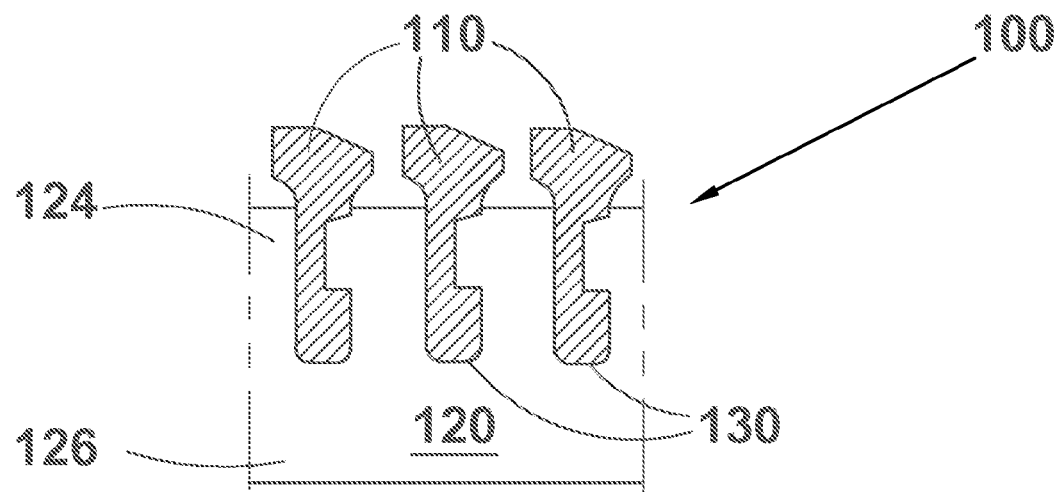
FIGS. 3 and 4 illustrate a preferred embodiment of the support element-screen wire combination of the present invention.
Figure 4:
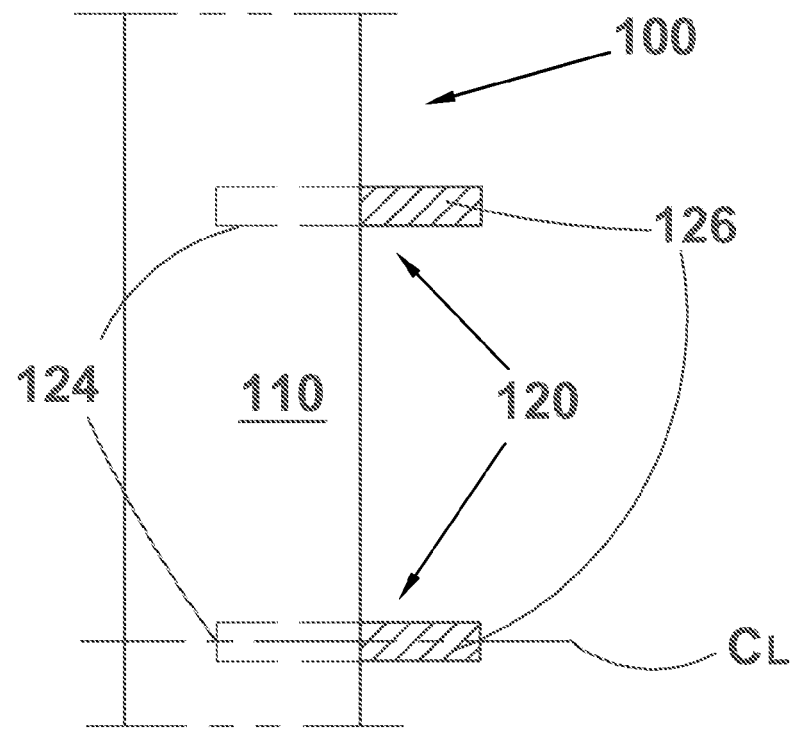

FIG. 3 illustrates a partial radial cross-section of a screen cylinder 100 in accordance with the present invention in an enlarged scale showing a support ring 120, its first rim area 124, its second rim area 126 and the cross-section of three screen wires 110 in one of their numerous preferred forms. The screen wires 110 have been installed in the notches 130 machined in the first rim area 124 of the support ring 120. FIG. 4 is likewise a partial, now axial, cross-section of the screen cylinder 100 showing a screen wire 110, the cross-section of the support ring 120, and the second rim area 126 opposite to the first rim area 124 (shown in phantom) and the screen wire 110. The circumferential surface of rings 120 having the notches 130 is called the first rim, and the opposite solid circumferential surface the second rim. FIG. 4 also shows the centreline plane $C_L$ of the support ring 120, the plane extending in a radial direction.

A preferred, but of course not the only way of assembling a screen cylinder 100 in accordance with the present invention is such that the support elements 120 in the form of circular rings with appropriate keyhole or dovetail notches 130 in their first rim areas or corresponding openings are attached to a jig (not shown). The support rings 120 may be made by rolling a bar to a circular ring and welding the ends together or by cutting the ring 120 out of a metal plate. In the latter case, the support rings 120 are thus made without a seam. The distance between adjacent support rings 120 is of the order of 20 to 100 mm, just to give a rough example. In fact the distance may vary in accordance with the screen cylinder size, the screen wire size, the forces being applied to the screen cylinder 100, its application, etc. Next, screen wires 110 are pushed through the notches/openings 130 in the support rings 120. Preferably, the notches or openings 130 in all the rings 120 are alike. After all the screen wires 110 have been inserted in the notches/openings 130 of the support rings 120, the screen wires 110 are fastened so that they cannot move in the direction of their longitudinal axis anymore. This is performed by means of heating the second rim area 126 of a support ring 120. In other words, the heating of the second rim area 126 is performed as evenly and uniformly as possible such that the support ring 120 expands thermally substantially in the radial plane or substantially in the radial direction i.e. without bending, twisting or tilting. The heating may be performed either by subjecting merely the surface of the second rim 126 (radially outer or inner surface of the support ring) to heating or by subjecting both opposite substantially radially extending side faces of the support ring 120 at the second rim area to heating or both. Uniform heating may also be possible by heating of the side of the support ring 120 in certain situations where, for example, the support ring 120 is thin and wide, and thus where the conductance of heat through the ring 120 in the axial direction is much greater and faster than conductance of heat radially. Thus, by the second rim area 126 is understood both the axial surface of the rim and the side surfaces of the support ring 120 extending substantially radially from the second rim 126 inwards or outwards up to approximately the half of the radial dimension of the support ring 120 as well as the contained volume. While the axial surface is most often planar, any other shape e.g.

rounded or longitudinally/circumferentially grooved may be used. In a corresponding manner the first rim area 124 extends from the first rim up to approximately the half of the radial dimension of the support ring 120. Normally the support rings 120 are made of stainless steel whereby the applicable heating temperature for the rings is about 450-1100 degrees Celsius. After the second rim area 126 of the ring 120 is heated to a desired temperature, the support ring 120 is allowed to cool down, preferably in room temperature, whereby the support ring 120 starts retracting in a radial plane (again without bending, twisting or tilting in the axial direction) such that the second rim 126 or the free rim of the support ring 120 passes its original position. In other words, both the internal and the external diameter of the support ring 120 become smaller than that before the heating. The reason for the above described function is the following. When heating locally the second rim area 126 of the support ring 120 the temperature of the first rim area 124 remains substantially lower. This is due to both local heating at the second rim area 126 only, and cooling of the first rim area 124 by its internal and adjacent structures. Due to constraining thermal expansion of the support ring 120 by its internal structure and the adjacent structure and to the lower temperature of the first rim area 124, the second rim area 126 is not able to expand as much as the temperature raise would indicate, whereby the heated second rim area 126 is subjected to compressive stresses resulting in plastic deformation of the second rim area 126. When allowing the deformed second rim area 126 of the support ring 120 to cool down (as well as the entire ring), first a tensile stress is created at the second rim area 126, and then a compressive stress is created in the first rim area 124 resulting in the deformation of the first rim area 124, which leads to the reduction of the diameter of the support ring 120 compared to its diameter prior to the heating. The plastic deformations or the effect of heating may be verified as local variations in the metallurgical character of the support rings 120. The stresses remain in the ring such that approximately one half (30-70% of the radial dimension) of the support ring 120, i.e. the first rim area 124 (the rim area including the notches 130 for the screen wires 110) is subjected to compressive stresses and approximately another half (70-30% of the radial dimension) i.e. the second rim area 126 to tensile stresses. The result of all this is that while the screen wires 110 were inserted in their notches 130 in the support ring 120 before the heating, the retraction of the support ring 120 clamps the screen wires 110 firmly in the notches 130. The shrinkage of the support ring 120 in accordance with the present invention i.e. the reduction of the diameter of the support ring 120 is of the order of 0.2-1.0%, preferably more than 0.5%, sometimes even above 1.0%, which is, in fact, also the shrinkage of the notch 130 or opening dimensions in the support ring 120. Performed experiments have shown that such shrinkage is sufficient for ensuring that the screen wires 110 remain firmly in their notches 130, and cannot move in any direction, including also the longitudinal direction thereof. However, it should be understood that the even and uniform heating (and cooling) of the support rings 120 in accordance with the present invention may be performed as many times as desired, whereby each heating/cooling cycle reduces the diameter of the support rings 120 and increases the compressive force holding the screen wires 110 in place in the notches 130.

There are several options for performing the heating of a support ring 120. Firstly, for heating a few different heating means may be used, and secondly, the heating itself may be performed in a few different manners. To start with, the second rim area 126 of a support ring 120 may be heated by means of a heating torch. However, accurate control of the heating with a torch is very difficult. In other words, the area subjected to the heating is hard to adjust, as well as the temperature of the support ring 120. However, in some cases a heating torch can be used, as its use does not require any expensive investments whereby it is a cost-effective means of heating.

As a second means of heating, an inductive heating may be mentioned. Inductive heating can be controlled substantially accurately so that a desired heating pattern may be used.

Laser may be mentioned as the third heating means. The controllability of laser is far better than that of the earlier heating means in view of both the area and the temperature.

Also more traditional heating means may be employed such as electrical resistance or simple conduction for heating the support ring.

Figure 5:
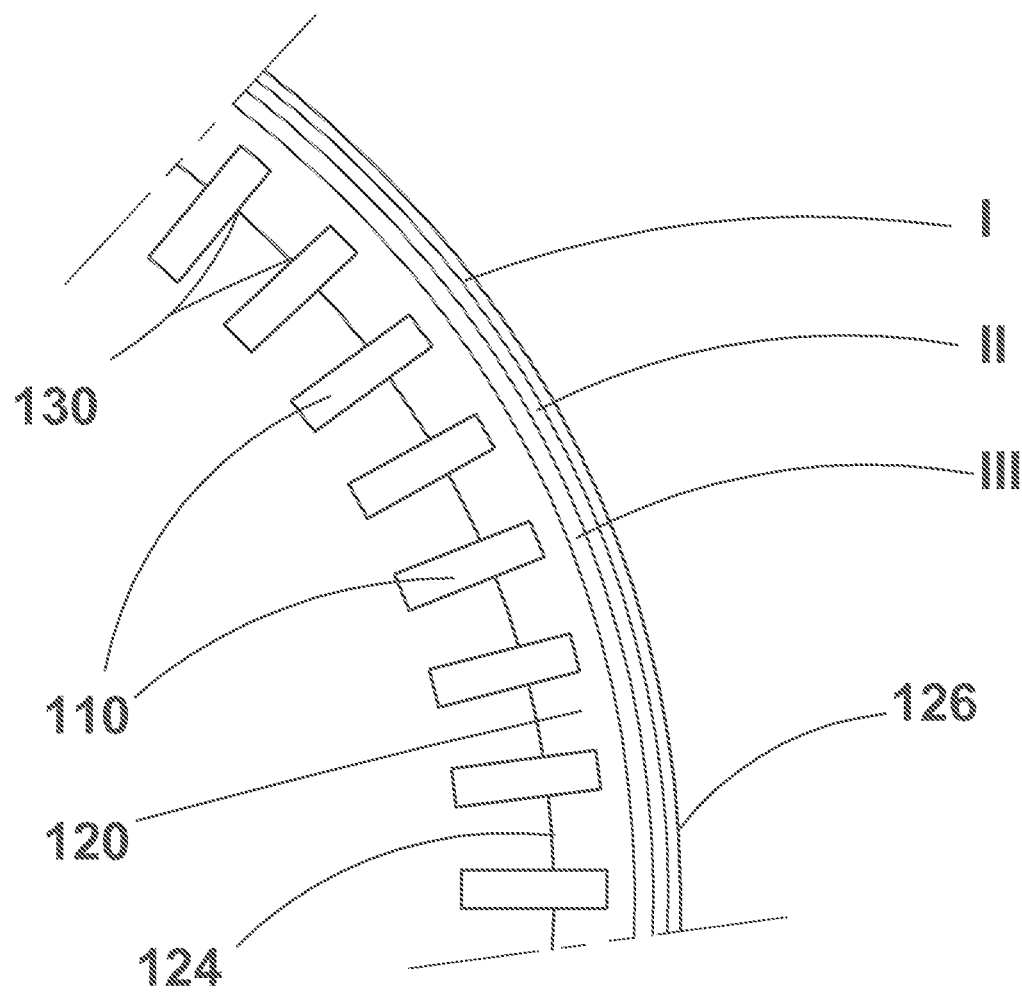
FIG. 5 is a somewhat closer representation of a support ring in accordance with a preferred embodiment of the present invention.

As to the use of the heating of the support rings 120 in the manufacture of a screen cylinder 100 several different ways may be used. Firstly, it is possible that each and every support ring 120 of a screen cylinder 100 is heated in a similar manner, whereby all screen wire—support ring joints are identical. Secondly, it is also possible that all support rings 120 are not heated in an identical manner. For instance, it is possible that odd support rings counted from an end of a screen cylinder 100 are not heated at all or are heated less, i.e. to a lower temperature by using reduced power than the even support rings. By doing this the screen wires 110 are forced to a wavy form, as every second support ring 120 has a smaller diameter than the adjacent support rings 120. Naturally the choice between the support rings 120 heated with full power and with reduced power may be different. For instance one ring may be heated with full power, the next with reduced power, next with no heating etc., or one ring with full power, the next two rings with reduced power, next ring with full power, the next two with reduced power etc. Further, as shown in FIG. 5, it is also possible to arrange the heating to advance or to be performed in several stages. This can be accomplished by various ways. An option is to divide the support ring 120 into several angular segments, and heat the second rim area 126 of at least one segment at a time. Another option is to divide the second rim area 126 of the support ring 120 into several annular zones, and heat at least one zone at a time. For instance such that the zone I (closest to the edge of the second rim 126) of a support ring 120 is first heated on both sides of the support ring 120 to a desired temperature (between 450-1100 degrees Celsius), the ring 120 is allowed to cool for a while, whereafter the ring 120 is heated again but now at a zone II somewhat farther away from the edge of the second rim 126 of the support ring 120. Performed tests have shown that the shrinkage of a support ring 120 heated, and cooled, in this two-stage manner is greater than that of a ring heated in a single stage. Even in spite of the fact that the heating would, in the single stage option, be extended to both zones I and II. Hence, it is naturally also possible to perform the heating in more than two stages, too, as exemplified by zone III in FIG. 5. The order of heating may also be changed. In other words, it is possible to start the heating on zones II or III, and then advance towards zone I. Also, it is possible to perform the two-stage, or in more general terms, multi-stage heating for the entire second rim area 126, whereby the second rim area 126 is first heated to a desired temperature, allowed to cool down, then reheated, and again allowed to cool down. The discussed heating sequence may be repeated as many times as desired to reach the optimal shrinkage of the support ring 120. Maximizing the shrinking effect in one or more above described manner can be utilized in two different ways. Firstly, the clamping force i.e. the friction force preventing the screen wires 110 from sliding in their longitudinal direction in their notches 130 can be maximized. Or secondly the installation of the screen wires 110 in their notches/openings 130 may be made easier by allowing a slightly larger assembly tolerance without still sacrificing the friction force. Ideally, the heating is performed in a similar manner and at the same time on the opposite sides of the support ring 120, too. In other words, the support ring 120 is heated on its both lateral sides simultaneously, and with the same power. A way to express the way the heating is done is to say that the heating of the support ring is performed evenly and uniformly, i.e. symmetrically in relation to the radial centreline plane $C_L$ (see FIG. 4) of the support ring, but asymmetrically in radial direction. For practical purposes, however, and in certain situations where axial heat conductance through the support ring is many times greater and faster than radial conduction between the first and second rim areas, one may be able to induce heating which is essentially uniform by heating on one side in a way that does not lead to any twisting or tilting.

It is also possible to combine the above discussed options having more than one stage. I.e. it is possible to divide an angular sector of the second rim area 126 into radial zones, and then heat one or more zones at a time, and in a desired order. And repeating the heating as many times as desired.

At this stage it has to be understood that the present invention is applicable to the manufacture of both an outflow screen cylinder and an inflow screen cylinder. In fact, the only difference is that the means used for heating the support rings 120 when manufacturing an inflow screen cylinder have to be positioned inside the screen cylinder. Therefore the description already above discusses the first 124 and second rim areas 126 of the support ring 120, the first rim area 124 including the notches 130 and the second rim area 126 being the heated one opposite to the first rim area 124. In other words, in an inflow screen cylinder the first rim area 124 is the radially outer rim area, and the second rim area 126 the radially inner one, and in an outflow screen cylinder, the first rim area 124 is the radially inner one, and the second rim area 126 the radially outer one. Also, it should be understood that the screen cylinder 100 of the present invention may not only be used as a stand-alone screen cylinder but also as a functional screen element of a screen drum having a reinforcing support shell against which the second rims 126 of the support rings 120 of the screen cylinder 100 are positioned. Such a screen drum structure has been discussed in more detail in U.S. Pat. No. 5,200,072.

As mentioned already above an option to consider concerning the heating is whether to subject either the entire rim area or an annular zone of the second rim area of the support ring, or a segment of the second rim area or of a zone of the second rim area of the support ring to the heating. It is quite natural that by means of inductive heating it is possible to heat the entire second rim area of the support ring at a time or to subject only an annular zone (for instance I, II or III), or a segment at a time to heating. Also, it is easy to understand that the heating of the entire rim area of the support ring by means of heating torches is hardly possible, or at least difficult due to high amount of heat spreading all over the surroundings. At least a risk of heating of the screen wires is high when using heating torches, whereby proper insulation of the screen wires from the heat is worth consideration. As to the laser, it can be used for both total heating or segmented heating, as desired.

There are, naturally, also several different ways to arrange the heating. If heating torches or similarly working local heating means are used, a preferable way of treating the support rings is to first position the screen cylinder, after all the wires are inserted, and properly positioned in the axial direction, into the notches of all support rings, on rolls, bring heating means in their heating position and rotate the cylinder to heat a certain area of one or more support rings. Naturally, it is possible to heat one or several support rings at a time. Probably the limiting factor is the size of the heating means i.e. because the support rings are substantially close to each other there may not be enough room for the heating means to heat all the support rings simultaneously. However, spreading the heating means in different angular positions round the screen cylinder is a viable option to solve that problem, at least partially.

Another option, which is especially suitable when the heating means is by using a laser, is to use an arm running in parallel with the screen cylinder axis and having a desired number of laser heating elements positioned such that they heat both lateral faces of desired number of support rings. Now by moving the arm in relation to the screen cylinder in a radial and/or in a circumferential direction a desired heating pattern on the faces of the support rings is formed and each support ring is subjected to identical heating, unless the heating energies of some laser heating elements are adjusted to result in non-uniform shrinking of some support rings.

The above specification should be understood to discuss an exemplary screen cylinder formed of screen wires and support rings. Thereby the cross section of both the screen wires and the support rings may be whatever is applicable for the construction of the screen cylinder. Thus it is clear that the cross section of the support ring need not necessarily be rectangular but also trapezoidal, triangular or rounded shapes may be applied. Thus, the phrase "substantially radial" in connection with the side faces of the support ring take into account the trapezoidal, triangular and possibly rounded forms of the side faces.

It should be understood that the above is only an exemplary description of a novel and inventive method of manufacturing a screen cylinder. The above should not be understood as limiting the invention by any means but the entire scope of the invention is defined by the appended claims only.

The invention claimed is:

1. A method of manufacturing a screen cylinder, said screen cylinder formed of at least a number of screen wires, wherein pairs of adjacent screen wires provide a screening slot therebetween, and substantially circular support rings, said support rings having a first rim area provided with notches into which said screen wires are installed, and a second rim area opposite to said first rim area, the method comprising:
   a) after installing some of the screen wires into said notches of said support rings, evenly and uniformly heating the second rim area of at least one of said support rings such that a temperature of the first rim area remains lower than a temperature of the second rim area, and whereby the second rim area is deformed, and
   b) allowing at least one of said support rings to cool to decrease a diameter of the at least one of said support rings, whereby the first rim area is deformed and the screen wires are clamped in said notches.

2. The method as recited in claim 1, wherein heating the second rim area comprises raising the temperature of the second rim area of the support rings locally to between 450 and 1100 degrees Celsius.

3. The method as recited in claim 1, wherein the heating is practiced by one of a heating torch, inductive heating, resistance heating, conductive heating, and laser.

4. The method as recited in claim 1, wherein heating the second rim area comprises at least one of heating a surface of the second rim area and heating opposite side faces of the second rim area.

5. The method as recited in claim 4, wherein heating the second rim area and allowing the second rim area to cool is practiced in several successive stages.

6. The method as recited in claim 4, further comprising dividing the second rim area of one of the support rings into annular zones, and wherein heating the second rim area comprises heating the annular zones in separate stages.

7. The method as recited in claim 6, wherein heating the annular zones in separate stages comprises allowing one annular zone to cool before heating another annular zone.

8. The method as recited in claim 3, further comprising dividing the second rim area into angular segments, and wherein heating the second rim area comprises heating the annular segments in separate stages.

9. The method as recited in claim 1, wherein heating the second rim area of at least one of said support rings comprises one of heating the second rim area of all support rings, heating the second rim area of some of the support rings, and heating the second rim area of some of the support rings with a reduced power.

10. The method as recited in claim 1, wherein the method further comprises, while heating the second rim area of at least one of said support rings, one of moving the cylinder and keeping a heating element stationary and moving the heating element and keeping the cylinder stationary.

11. The method as recited in claim 1, wherein the notches are adapted to allow form locking of the number of screen wires in the support rings.

12. The method as recited claim 1, wherein the diameter of the support ring is reduced at least 0.2%.

13. The method as recited in claim 1, wherein the method further comprises constraining thermal expansion of the at least one of said support rings during heating with an adjacent structure.

14. The method as recited in claim 1, wherein heating the second rim area evenly and uniformly comprises heating the second rim area symmetrically in relation to a radial centerline plane, $C_L$, of the support ring.

15. The method as recited in claim 1, wherein heating the second rim area evenly and uniformly comprises raising the temperature of the second rim area of the support rings locally to between 450 and 1100 degrees Celsius.

* * * * *